United States Patent
Saito

(10) Patent No.: US 6,822,714 B1
(45) Date of Patent: Nov. 23, 2004

(54) LIQUID CRYSTAL DISPLAY ELEMENT AND METHOD FOR MANUFACTURING IT

(75) Inventor: Yoshimasa Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 09/688,733

(22) Filed: Oct. 16, 2000

(30) Foreign Application Priority Data

Oct. 15, 1999 (JP) .......................................... P11-294626

(51) Int. Cl.[7] .......................................... G02F 1/1337
(52) U.S. Cl. ...................................... 349/129; 349/128
(58) Field of Search ................................ 349/128, 123, 349/124, 129, 130

(56) References Cited

U.S. PATENT DOCUMENTS 5,657,105 A * 8/1997 McCartney ................. 349/157
5,909,265 A * 6/1999 Kim et al. ................... 349/129
6,097,463 A * 8/2000 Chen ........................... 349/130

* cited by examiner

Primary Examiner—Robert H. Kim
Assistant Examiner—Thoi V. Duong
(74) Attorney, Agent, or Firm—Robert J. Depke; Holland & Knight LLP

(57) ABSTRACT

An ultraviolet light responsive type liquid crystal alignment films are formed on opposing surfaces of a pair of transparent substrates constituting a liquid crystal cell. Next, the liquid crystal alignment films on the transparent substrates parallel to a reference plane are irradiated by a polarized ultraviolet ray dividedly by the pixel or by the dot so as to regulate an alignment direction of the liquid crystal. Furthermore, the transparent substrate that has been irradiated by the polarized ultraviolet at the previous step is irradiated by the polarized ultraviolet ray dividedly by the pixel or by the dot for developing a pre-tilt angle after rotating the transparent substrate on the reference plane so that the transparent substrate turns to a direction different from its direction at the previous step.

7 Claims, 7 Drawing Sheets

FIRST IRRADIATION

SECOND IRRADIATION

LIQUID CRYSTAL DISPLAY ELEMENT AND METHOD FOR MANUFACTURING IT

BACKGROUND OF THE INVENTION

1. Field of the Invention

The present invention relates to a liquid crystal display element superior in its viewing angle characteristic. Moreover, the present invention relates to a method including a process of performing a liquid crystal alignment treatment and a pre-tilt angle forming treatment by irradiating a polarized ultraviolet ray for manufacturing a liquid crystal display element superior in its viewing angle characteristic.

2. Description of the Related Art

In a mechanical rubbing method that is performed as a liquid crystal alignment treatment at the time of manufacturing a liquid crystal display element, there have been caused problems such as pollution by dust risen at the time of rubbing, electrostatic damage caused by friction to a transparent substrate on which a TFT (Thin Film Transistor) element is loaded, and the decline of the manufacturing yielding percentage owing to the pollution and the electrostatic damage.

Consequently, in place of the mechanical rubbing method, there is drawn attention a photo-alignment control technique capable of causing the liquid crystal alignment without touching. See Japanese Patent Application Publication Hei 07-318942 (basic application of U.S. Pat. No. 5,604,615), etc.

This technique is a technique for realizing directionality and a pre-tilt angle of the liquid crystal alignment in an organic alignment film formed on a transparent substrate by causing a chemical change of molecules composing the organic alignment film in accordance with the polarized direction of an ultraviolet ray irradiating the organic alignment film. Consequently, the technique can prevent occurrence of the pollution owing to the dust risen at the time of the mechanical rubbing and the electrostatic damage to the board on which the TFT element is loaded, and can prevent the decline of the manufacturing yielding percentage.

Furthermore, because the technique can make the polarized ultraviolet ray irradiate only fine areas, the liquid crystal alignment of the fine areas in the liquid alignment film can easily be done. Therefore, the improvement in a visual field angle can be made by performing division alignments of one liquid crystal alignment film. To adduce an actual example, for making main viewing angle directions of a liquid crystal display element even in the vertical direction and the horizontal direction, the technique executes a liquid crystal alignment treatment of irradiating liquid crystal alignment films of upper and lower boards in four respective divided areas "aa", "bb", "cc" and "dd" of one dot 70, shown in FIG. 7, with a polarized ultraviolet ray so that the liquid crystal alignments of the lower substrate become the directions of the dotted line arrow heads and so that the liquid crystal alignments of the upper substrate become the full line arrow heads. Because main viewing angle directions of respective divided areas become the directions of the stars in the figure as the results, the main viewing angle direction of the whole liquid crystal display element becomes a mixture of viewing angle characteristics in four directions of the up, the down, the right and the left. Consequently, an inversion phenomenon and the decline of contrast can be suppressed, so that the visual field angle becomes good.

Incidentally, in this case, for using the main viewing angle directions of the liquid crystal display element of two directions of the right and the left, it is applicable to divide one dot into two areas.

However, in a case where the liquid crystal alignments are executed by diving one dot into two or four areas like the prior art technique, because alignment disorder occurs at boundaries of the divided areas (division boundaries), it is necessary to shade the upper substrate where a color filter is formed from rays penetrating the divided areas. For this reason, it is necessary to dispose shading areas at not only between dots but also crossing areas in a dot as denoted by the reference numerals 70*a* and 70*b* in FIG. 7. Consequently, a decline of aperture ratio of a dot and a decline of the transmissivities of rays are caused, and thereby there is caused a problem that the display quality of the liquid crystal display element declines as a result. The tendency becomes remarkable as the dot becomes finer, and the manufacturing yielding percentage also becomes declined.

Furthermore, when manufacturing such a liquid crystal display element, the liquid crystal alignment is performed by the irradiation of the polarized ultraviolet ray in conformity with the technique. But, the technique has problems such that it is difficult for the technique to define the alignment direction of a liquid crystal strictly and also it is difficult for the technique to develop a prescribed pre-tilt angle stably in comparison with the mechanical rubbing method. Consequently, problems of declinations of display quality such as the occurrence of unevenness of alignment and a declination of transmissivity and contrast of a display using a liquid crystal cell the liquid crystal alignment treatment of which has been performed by irradiating a polarized ultraviolet ray thereon are not resolved yet. That has been a great barrier to perform the mass production thereof.

SUMMARY OF THE INVENTION

The present invention aims to resolve the aforesaid problems of the prior art, and aims to provide a liquid crystal display element having a superior viewing angle characteristic without causing a decline of aperture ratio and a decline of transmissivity of a ray at a pixel composed of a group of three dots of an R-dot, a G-dot and a B-dot, or each dot. Moreover, the present invention also aims to realize a good liquid crystal alignment direction and a stable and even pre-tilt angle by means of a polarized ultraviolet ray without a decline of the manufacturing yielding percentage at the time of manufacturing such a liquid crystal display element.

The inventor of the present invention found the following facts and has completed a liquid crystal display element of the present invention. That is, the main viewing angle direction of the whole liquid crystal display element can be adjusted in an intended direction by performing a division alignment treatment of a liquid crystal alignment film on a transparent substrate while keeping a unique alignment direction at each pixel not dividing a pixel (ordinary composed of a group of an R-dot, a G-dot and a B-dot) and differentiating alignment directions at least between two pixels so as to be able to obtain an intended main viewing angle direction. And further, if a dot is still finer, the superior viewing angle characteristic can be obtained by performing the adjustment of the main viewing angle direction by the dot, not by performing the control of the main viewing angle by the pixel.

Furthermore, the inventor of the present invention found the following fact and has completed a method for manufacturing a liquid crystal display element of the present invention. That is, it is possible to develop a superior viewing angle characteristic and an even and stable liquid crystal alignment and pre-tilt angle of the liquid crystal display element without a decline of the manufacturing yielding percentage by irradiating a liquid crystal alignment film on a transparent substrate by the pixel and/or by the dot with divided polarized ultraviolet rays in a manner that the irradiation of the polarized ultraviolet ray is first performed for regulating liquid crystal alignment directions, and that the transparent substrate is next rotated, and further that the divisional irradiation of the polarized ultraviolet ray is again performed by the pixel or by the dot for regulating the pre-tilt angle of the liquid crystal.

That is to say, according to a first aspect of the present invention, there is provided a liquid crystal display element including a pair of transparent substrates, a liquid crystal sandwiched between the pair of transparent substrates, and liquid crystal alignment films formed on liquid crystal side surfaces of the respective transparent substrates, wherein the liquid crystal alignment films are aligned dividedly by a dot and/or by a pixel, and liquid crystal alignment directions at two dots or more and/or at two pixels or more differ from each other so that it is possible to obtain an intended main viewing angle direction.

It is needless to say that the division by the dot and the division by the pixel may be intermingled by performing a division alignment composed of alignments by the dot in some areas of the liquid crystal display element and alignments by the pixel in the other areas of the liquid crystal display element.

Furthermore, according to a second aspect of the present invention, there is provided a method for manufacturing a liquid crystal display element including a pair of transparent substrates, a liquid crystal sandwiched between the pair of transparent substrates, and liquid crystal alignment films formed on liquid crystal side surfaces of the respective transparent substrates, the method comprising the steps of (a) forming ultraviolet ray responsive type liquid crystal alignment films on the pair of transparent substrates, (b) irradiating the liquid crystal alignment films on the transparent substrates parallel to a reference plane with a polarized ultraviolet ray dividedly by a dot and/or by a pixel so that liquid crystal alignment directions at two dots or more and/or at two pixels or more differ from each other for obtaining an intended main viewing angle direction so as to regulate an alignment direction of the liquid crystal, and (c) irradiating the transparent substrate, on which the liquid crystal alignment films irradiated with the polarized ultraviolet ray at the step (b) are formed, with the polarized ultraviolet ray dividedly by the pixel for developing a pre-tilt angle after rotating the transparent substrate on the reference plane so that the transparent substrate turns to a direction different from its direction in the step (b).

It is needless to say that the division by the pixel and the division by the dot may be intermingled in a liquid crystal display element also in this case.

According to the aforementioned aspects of the present invention, a liquid crystal display element is manufactured by irradiating divided area thereof by the pixel and/or by the dot with a polarized ultraviolet ray without using the conventional mechanical rubbing method. Consequently, the manufactured liquid crystal display element exhibits a superior viewing angle characteristic without a decline of its aperture ratio, a decline of its transmissivity of rays and a decline of its manufacturing yielding percentage. Moreover, because the division irradiation of the polarized ultraviolet ray is performed at predetermined two steps, good alignment directions and a stable and uniform pre-tilt angle of liquid crystal molecules can be realized. Consequently, an electro-optical characteristic of the manufactured liquid crystal display element becomes good.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

At first, a description is given to a liquid crystal display element of the present invention.

The liquid crystal display element of the present invention has a structure similar to an ordinary TN (Twisted Nematic) liquid crystal element that basically includes a liquid crystal sandwiched between a pair of transparent substrates, for example substrates made of glass, and liquid crystal alignment films formed on liquid crystal side surfaces of the transparent substrates.

In the present invention, liquid crystal alignment directions of the liquid crystal alignment films are divided by the pixel or by the dot for improving its viewing angle characteristic. However, the division is not made in a pixel, but the liquid crystal alignment directions are made to be different from each other among two or more pixels or dots so that an intended main viewing angle direction can be obtained. For example, in a case where the main viewing angle directions are made to be two directions facing to the left and the right, the liquid crystal alignment directions are made to be different from each other between two pixels or two dots. And, in a case where the main viewing angle directions are made to be four directions facing to the up, the down, the left and the right, it may be applicable that the liquid crystal alignment directions are made to be different from each other among four pixels or dots. In the case where the liquid crystal display element is used for a display of a personal computer, for example, it is preferable that the liquid crystal alignment directions are made to be different from each other among four pixels or dots.

Incidentally, it is preferable that pixels or dots the liquid crystal alignment directions of which are different from each other are disposed to adjoin to each other so that the viewing angle characteristics of the whole liquid crystal display element become even. However, the liquid crystal alignment directions may be disposed regularly or randomly so that the liquid crystal alignment directions are dispersed evenly in the whole liquid crystal display element.

Next, more concrete descriptions are given to examples of the division alignments of the liquid crystal alignment films of liquid crystal display elements according to the present invention.

Figure 1:
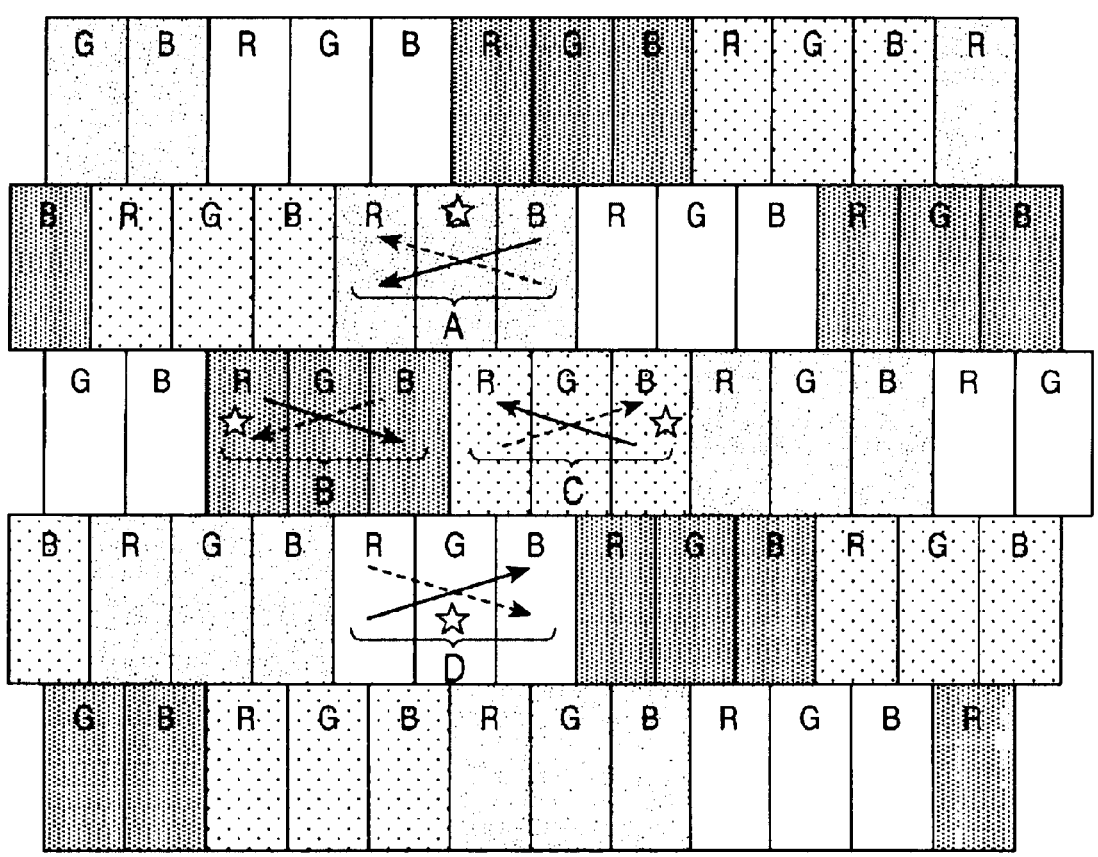
FIG. 1 is a schematic plan view showing an example, in which liquid crystal alignment directions are made to be different among four pixels, of division alignments of a liquid crystal alignment film of a liquid crystal display element according to the present invention.

FIG. 1 shows an example (delta disposition) where four pixels A–D (each pixel is composed of a group of an R-dot, a G-dot, and a B-dot) disposed in the so-called delta arrangement so as to make main viewing angle directions four directions of the up, the down, the right and the left are made to be divisionally aligned and liquid crystal alignment directions are made to be different from each other among them. That is, in the pixels A–D, when the liquid crystal alignment direction of the lower substrate is adjusted to the direction of the dotted line arrow head and the liquid crystal alignment direction of the upper substrate is adjusted to the direction of the full line arrow head, the main viewing angle direction to each of the pixels becomes the direction of each star. That is, the main viewing angle direction to the pixel A becomes upward; the main viewing angle direction to the pixel B becomes leftward; the main viewing angle direction to the pixel C becomes rightward; the main viewing angle direction to the pixel D becomes downward. Incidentally, main viewing angle directions of pixels hatched likewise in the figure are adjusted to be the same. Consequently, the viewing angle characteristics of a liquid crystal display element having the division liquid crystal alignment films shown in FIG. 1 from vertical directions and horizontal directions becomes improved.

Figure 2:
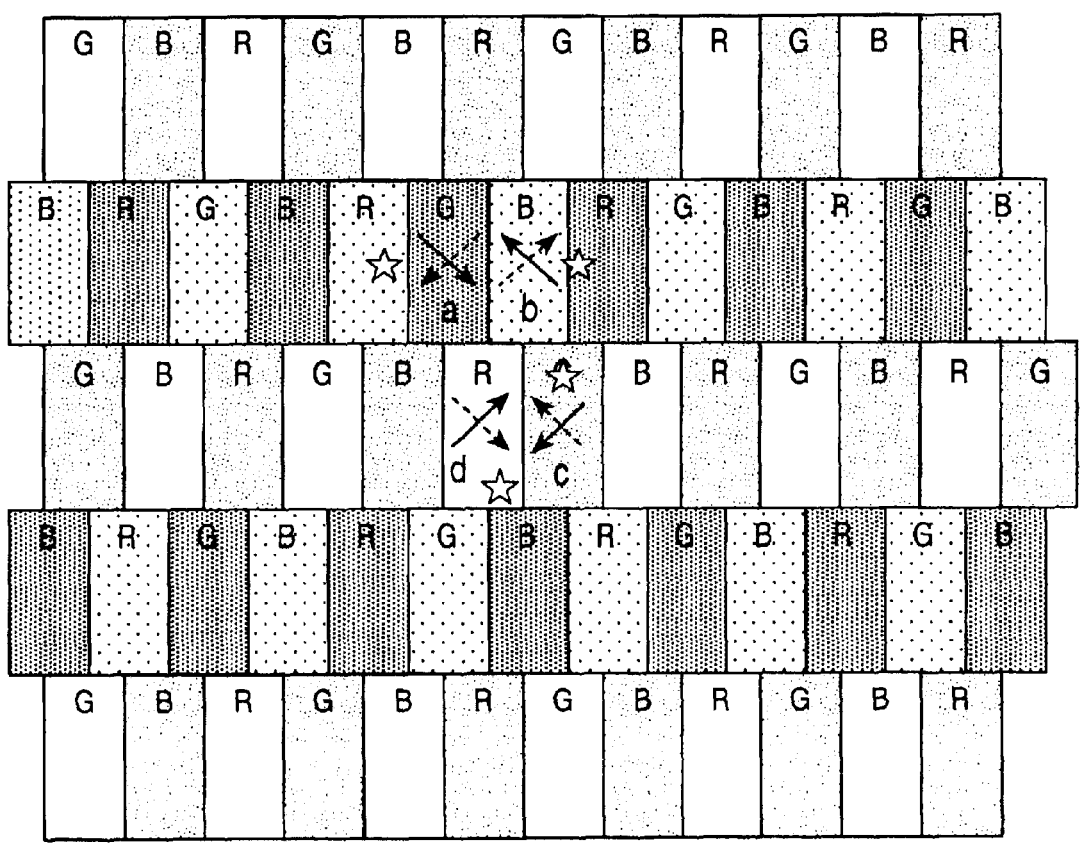
FIG. 2 is a schematic plan view showing an example, in which liquid crystal alignment directions are made to be different among four dots, of division alignments of a liquid crystal alignment film of a liquid crystal display element according to the present invention.

FIG. 2 shows another example (delta disposition) where liquid crystal alignment directions are made to be adjusted not by the pixel but by the dot. Likewise in the case of FIG. 1, to make main viewing angle directions four directions of the up, the down, the right and the left, four dots a–d disposed in the so-called delta arrangement are made to be divisionally aligned, and the liquid crystal alignment directions are made to be different from each other among them. That is, in the dots a–d, when the liquid crystal alignment direction of the lower substrate is adjusted to the direction of the dotted line arrow head and the liquid crystal alignment direction of the upper substrate is adjusted to the direction of the full line arrow head, the main viewing angle direction to each of the dots becomes the direction of each star. That is, the main viewing angle direction to the dot a becomes leftward; the main viewing angle direction to the dot b becomes rightward; the main viewing angle direction to the dot c becomes upward; the main viewing angle direction to the dot d becomes downward. Incidentally, main viewing angle directions of dots hatched likewise in the figure are adjusted to be the same. Consequently, the viewing angle characteristics of a liquid crystal display element having the division liquid crystal alignment films shown in FIG. 2 from vertical directions and horizontal directions also becomes improved.

Next, a description is given to a method for manufacturing a liquid crystal display element of the present invention.

A characteristic feature of the method for manufacturing a liquid crystal display element is to include a liquid crystal alignment treatment process composed of the following processes (a)–(c):

Process (a)

First, an ultraviolet light responsive type liquid crystal alignment film is formed on both of a pair of transparent substrates, respectively.

A substrate used for a TN liquid crystal cell conventionally can be used as one of the pair of the transparent substrates. There can be enumerated, for example, a transparent glass substrate the pixel density of which is 114 thousand pixels per $cm^2$ and on which a high temperature polysilicon type TFT element having a diagonal length of 0.55 inches (1.397 cm) or more and having the number of pixels of 113 thousands or more dots is formed, and a transparent glass substrate the pixel density of which is 10 thousand pixels per $cm^2$ and on which a high temperature polysilicon type TFT element having a diagonal length of 2.5 inches (6.25 cm) or more and having the number of pixels of 180 thousands or more dots is formed. That is, the present invention is useful particularly in a liquid crystal display element having a high pixel density. In a case of a transparent glass substrate having a high temperature polysilicon type TFT formed by applying a semiconductor process at about 1,000° C., the present invention is especially preferable in a case of a pixel density of 100 thousand pixels per $cm^2$ or more. And, in a case of a transparent glass substrate having a low temperature polysilicon type TFT formed by using a re-crystallization process with a laser, the present invention is especially preferable in a case of a pixel density of 10 thousand pixels per $cm^2$ or more.

As materials of the ultraviolet light responsive type liquid crystal alignment film, materials having characteristics of developing the alignment of a liquid crystal in a direction perpendicular to the polarized direction of a polarized ultraviolet ray may be used. For example, a poly amicacid macromolecular material being a polyimide type photoalignment material shown in U.S. Pat. No. 5,731,405 may be used.

The thickness of the liquid crystal alignment film is ordinary 0.02–0.08 $\mu$m.

An offset printing method, a spin coating method or the like can appropriately be selected in accordance with the material of the liquid crystal alignment film to be used as a method for forming the liquid crystal alignment film.

Furthermore, a glass substrate, on a surface of which a transparent conducting film (such as ITO (Indium Tin Oxide)) is formed, or the like can be used as the other of the pair of the transparent substrates.

Process (b)

Next, a liquid crystal alignment film on a transparent substrate parallel to a reference plane is irradiated by a polarized ultraviolet ray (a first irradiation) dividedly by the pixel and/or by the dot in a manner that liquid crystal alignment directions differ from each other among two or more pixels and/or dots so that an intended main viewing angle direction can be obtained for regulating the alignment direction of the liquid crystal. For set the transparent substrate parallel to the reference plane in this case, the transparent substrate may be placed on, for example, a steel flatbed (reference plane).

An ultraviolet ray that has passed through a polarization filter is used as the polarized ultraviolet ray. An ordinary polarization filter that makes only a ray having a predetermined direction pass is used as the polarization filter.

It is preferable to use an electrodeless UV lamp that has a high output level, a long life span and further high uniformity, i.e. little dispersion of illuminance, as the light source of the polarized ultraviolet ray.

Moreover, it is preferable that a polarized ultraviolet ray irradiation angle, namely an elevation angle to the reference plane in the first irradiation is within a range of 50 degrees to 90 degrees not for declining the contrast. 90 degrees is especially preferable.

Moreover, as a technique of the irradiation of the polarized ultraviolet ray in the manner of the division by the pixel or by the dot, it is useful to use a shading mask for preventing the irradiation of the polarized ultraviolet ray to areas other than the pixels of the dots to which the polarized ultraviolet ray should be irradiated, or to scan the polarized ultraviolet ray so as to irradiate only the intended pixels or dots.

Incidentally, the R-dots, the G-dots and the B-dots may be arranged in conformity with the delta arrangement or a stripe arrangement.

Process (c)

Next, the transparent substrate, on which the liquid crystal alignment film irradiated by the polarized ultraviolet ray at the first irradiation in the process (b), is rotated on the reference plane. In this case, the transparent substrate is rotated to a direction different from the direction in the process (b). And then, the polarized ultraviolet ray in a state of being divided by the pixel or by the dot is again irradiated (a second irradiation) to the liquid crystal alignment film on the rotated transparent substrate for developing the pre-tilt angle.

The reason why the transparent substrate is rotated is that a stable pre-tilt angle cannot be induced if the transparent substrate is not rotated. Now, the rotation angle is preferably within a range of 45–90 degrees, more preferably 90 degrees.

Moreover, the irradiation angle of the polarized ultraviolet ray at the second irradiation, namely an elevation angle to the reference surface, is preferably within a range of 50–80 degrees. If the angle is out of the range, the pre-tilt angle becomes small and the angle tends to become unstable.

Incidentally, the ratio between the ultraviolet ray irradiation energy at the first irradiation in the process (b) and the ultraviolet ray irradiation energy at the second irradiation in the process (c) is preferably 100:1 to 1:1, more preferably 5:1 to 3:1. When the ultraviolet ray irradiation energy at the second irradiation becomes relatively larger than the range, the pre-tilt angle tend to be declined. In addition, the similar liquid crystal alignment treatment is performed to the other transparent substrate.

By composing a liquid crystal cell in conformity with the conventional method with the transparent substrates the liquid crystal alignment treatment of which has been performed in conformity with the aforesaid processes (a)–(c), and by assembling a liquid crystal driving device and the like similarly to the manufacturing method for the conventional TN liquid crystal display element, a liquid crystal display element of the present invention can be obtained. Because the thus obtained liquid crystal display element realizes a stable and constant division alignment of its liquid crystal and has a stable pre-tilt angle, the viewing angle characteristic thereof is improved, and the liquid crystal display element can be manufactured at a high manufacturing yielding percentage, and further has a good electro-optical characteristic.

[EMBODIMENT]

Hereafter, the present invention is concretely described in regard to embodiments.

Embodiment 1

A polyimide type liquid crystal alignment agent (see U.S. Pat. No. 5,731,405) was coated in conformity with a conventional method on a glass substrate on which a low temperature polysilicon type TFT element having a diagonal length of 3.5 inches and the number of display dots of 200 thousands or more had been formed in conformity with a conventional method, and was coated on another glass substrate equipped with a color filter and an ITO transparent electrode on which any pattern is not formed as an opposed substrate to the aforesaid glass substrate. And then, the polyimide type liquid crystal alignment agent was provisionally dried for 30 minutes at 80° C. And further, the polyimide type liquid crystal alignment agent was mainly dried for 60 minutes at 190° C. for forming a liquid crystal alignment film.

Figure 3:
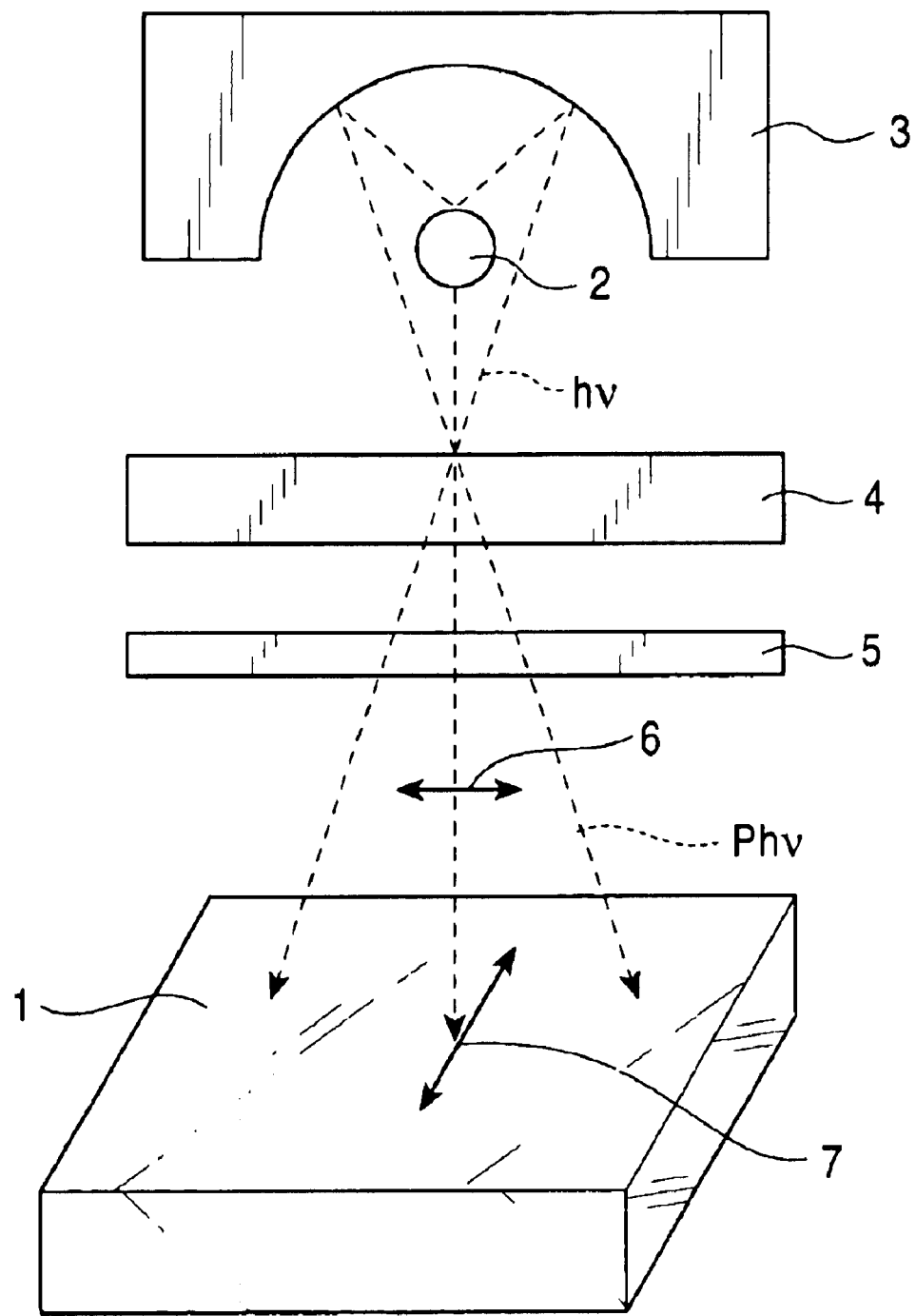
FIG. 3 is a block diagram showing a schematic structure of a ultraviolet ray irradiation apparatus to be used in a first embodiment of the present invention.
Figure 4A:
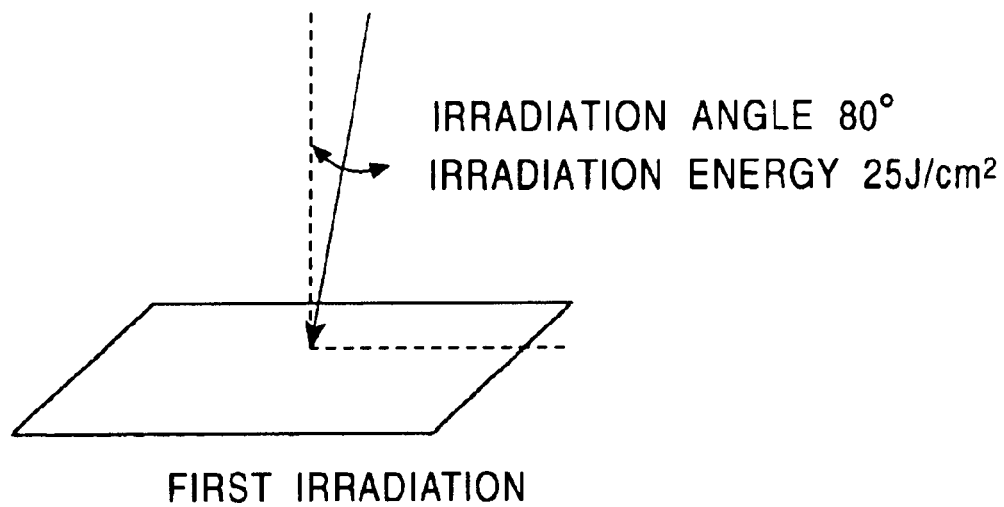
FIG. 4A and FIG. 4B are explanatory views showing polarized ultraviolet ray irradiation processes of the first embodiment of the present invention.
Figure 4B:
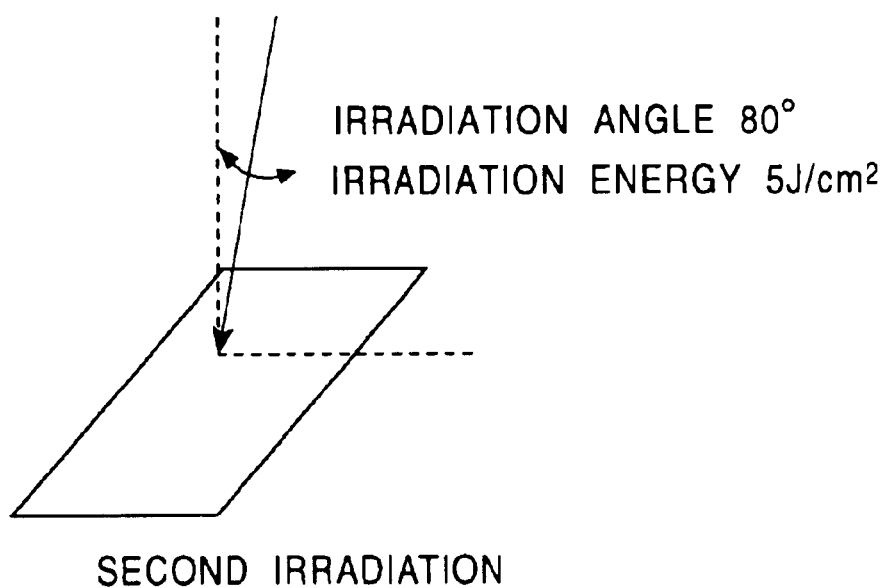

Next, a liquid crystal alignment treatment was performed to adjoining four pixels so as to obtain the main viewing angle directions shown in FIG. 1 by using an ultraviolet ray irradiation apparatus (or an electrodeless lamp, "H" bulb manufactured by Fusion UV Systems, Inc.) as shown in FIG. 3 and a shading mask for irradiating only predetermined pixels on the glass substrate with the polarized ultraviolet ray. That is, a ultraviolet ray hv from a lamp unit 3 equipped with a light bulb 2 was made to pass a polarization unit 4, the polarization degree of which was about 10:1, and a filter 5 cutting waves having wavelengths of 3,000 nm or less. And then, a P polarized ultraviolet ray (polarization axis is 5) Phv, which was the aforementioned ultraviolet ray hv after passing the polarization unit 4 and the filter 5, was irradiated at two steps by the pixel on the liquid crystal alignment film side surface of the transparent board 1 on which the liquid crystal alignment film had been formed as shown in FIG. 4A and FIG. 4B. Incidentally, the accumulated amount of the polarized ultraviolet ray of each pixel was 30 J/cm$^2$.

(CONDITIONS OF FIRST IRRADIATION)
elevation angle (irradiation angle): 80°
irradiation energy: 25 J/cm$^2$
ultraviolet ray intensity: 100±10 mW/cm$^2$
(CONDITIONS OF SECOND IRRADIATION)
transparent substrate rotation angle: 90°
elevation angle (irradiation angle): 80°
irradiation energy: 5 J/cm$^2$
ultraviolet ray intensity: 100±10 mW/cm$^2$ The similar liquid crystal alignment treatment was performed to the transparent substrate on the other side.

A pair of the transparent substrates to which the aforementioned liquid crystal alignment treatment was respectively performed by irradiating the polarized ultraviolet ray were affixed to each other with a gap of 3.5 μm so as to take the liquid crystal alignment directions shown in FIG. 1. A TN liquid crystal cell was made by inserting a liquid crystal into the gap. The disposition of the polarizing plate was made to be a normal white disposition where the polarization axis is perpendicular to the alignment axis.

Figure 5:
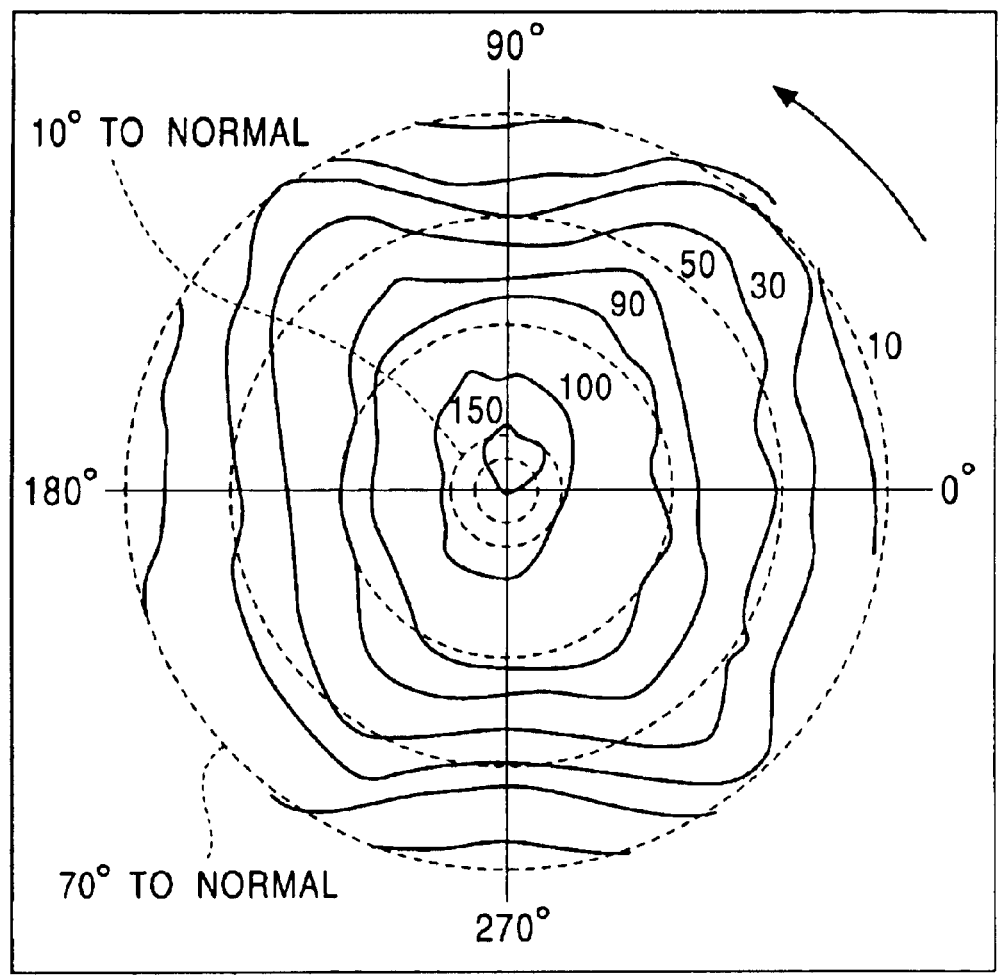
FIG. 5 is a view showing a viewing angle characteristic of a liquid crystal panel of the first embodiment of the present invention.

A TN liquid crystal panel was made in conformity with a conventional method by using the TN liquid crystal cell. When the viewing angle characteristics of the obtained TN liquid crystal panel were measured, the viewing angle characteristics were ±75° in the up, the down, the right and the left directions. And the contrast of 150 or more was obtained (see FIG. 5).

Incidentally, since the two-step irradiations of the polarized ultraviolet ray were performed to the liquid crystal panel of the embodiment for the liquid crystal alignment treatment, the pre-tilt angle was 5.7°, and it was stable and constant.

Embodiment 2

A TN liquid crystal panel was made similarly to the embodiment 1 except that the liquid crystal alignment treatment similar to that of the embodiment 1 was performed to four adjoining dots shown in FIG. 2 in place of four adjoining pixels. When viewing angle characteristics of the obtained TN liquid crystal panel were measured, viewing angle characteristics and contrasts substantially the same as those of the TN liquid crystal panel of the embodiment 1 were obtained.

Incidentally, since the two-step irradiations of the polarized ultraviolet ray were performed to the TN liquid crystal panel of the embodiment for the liquid crystal alignment treatment, the pre-tilt angle was 5.8°, and it was stable and constant.

Comparative Example 1

Figure 6:
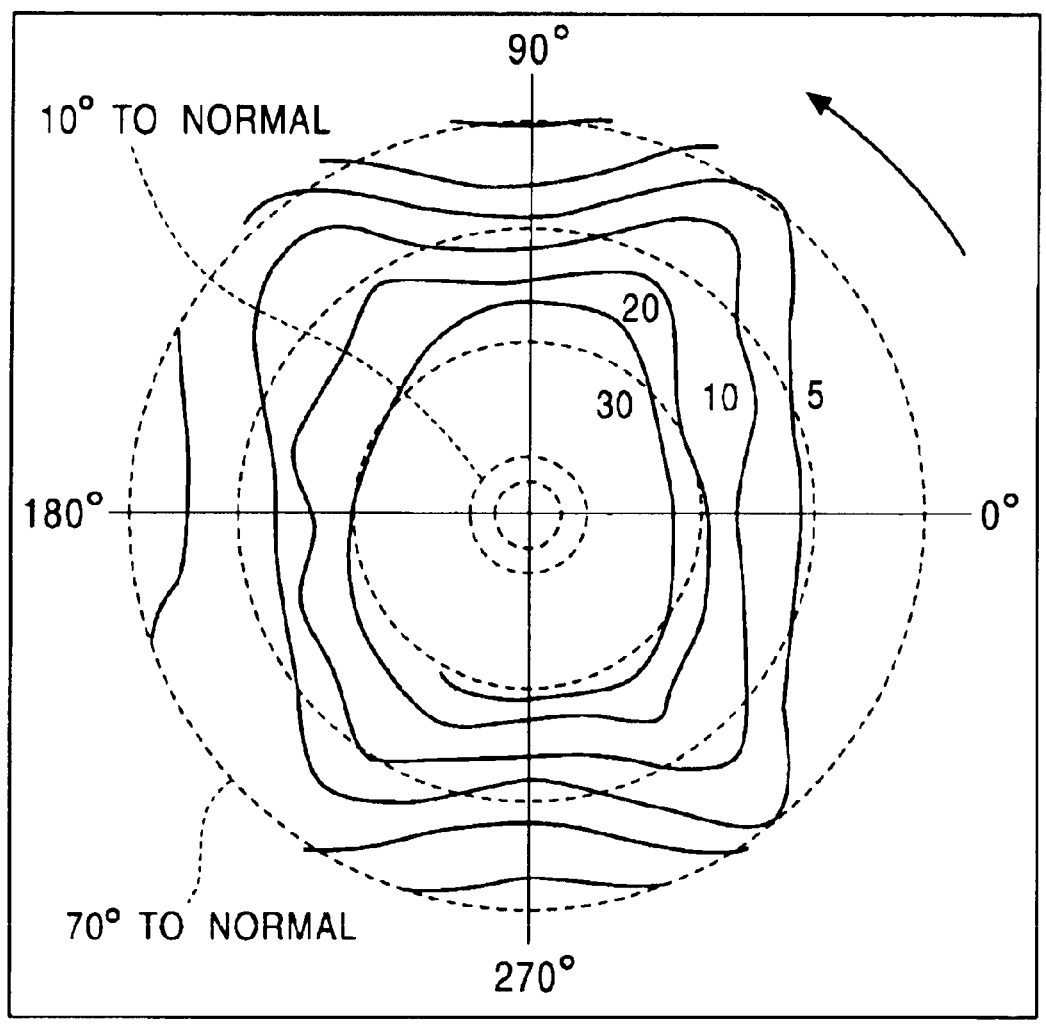
FIG. 6 is a view showing a viewing angle characteristic of a liquid crystal panel of a first comparative example 1 of the present invention.
Figure 7:
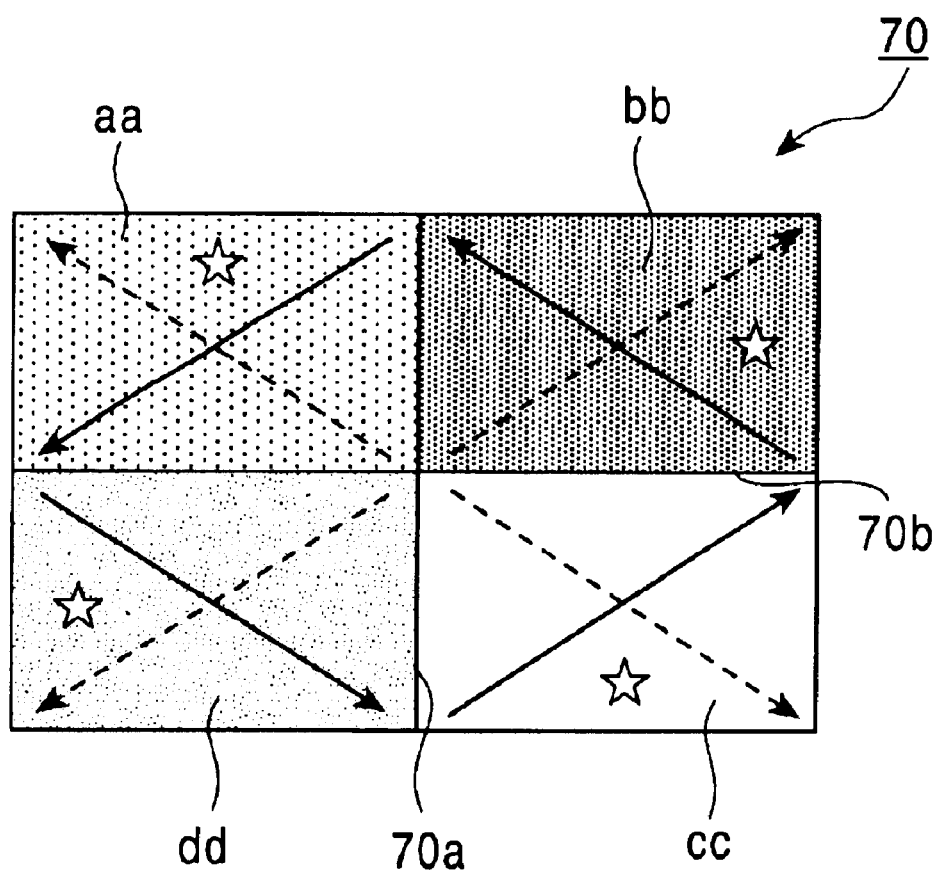
FIG. 7 is an explanatory view showing a conventional division alignment method where liquid crystal alignment directions are made to be different among four areas of one dot.

A TN liquid crystal panel was made similarly to the embodiment 1 except that the liquid crystal alignment treatment similar to that of the embodiment 1 was performed to one dot divided into four areas in place of four adjoining dots. When viewing angle characteristics of the obtained TN liquid crystal panel were measured, viewing angle characteristics substantially the same as those of the TN liquid crystal panel of the embodiment 1 were obtained. However, contrasts were declined greatly to below 30 (see FIG. 6).

However, since the two-step irradiations of the polarized ultraviolet ray were performed to the TN liquid crystal panel of the comparative example for the liquid crystal alignment treatment, the pre-tilt angle was 5.2°, and it was stable and constant.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A liquid crystal display comprising a pair of transparent substrates, a liquid crystal sandwiched between said pair of transparent substrates, and liquid crystal alignment films formed between side surfaces of said respective transparent substrates and said liquid crystal, wherein:

each of a plurality of dot regions of said display has a first alignment direction for a front alignment film portion of said dot and a second alignment direction for a back alignment film portion of said dot with no other alignment directions for said dot;

wherein four closely arranged dot regions each have two different alignment directions for the respective front and back alignment films and none of the four dot regions share two common alignment directions.

2. A liquid crystal comprising a pair of transparent substrates, a liquid crystal sandwiched between said pair of transparent substrates, and liquid crystal alignment films formed between side surfaces or said respective transparent substrates and said liquid crystal, wherein:

each of a plurality of pixel regions of said display has a first alignment direction for a front alignment film portion of said pixel and a second alignment direction for a back alignment film portion of said pixel with no other alignment directions for said pixel, wherein each of four closely arranged pixel regions do not share two common alignment directions.

3. A liquid crystal comprising a pair of transparent substrates, a liquid crystal sandwiched between said pair of transparent substrates, and liquid crystal alignment films formed between side surfaces of said respective transparent substrates and said liquid crystal, wherein:

each of a plurality of pixel regions of said display has a first alignment direction for a front alignment film portion of said pixel and a second alignment direction for a back alignment film portion of said pixel with no other alignment directions for said pixel;

wherein adjacent pixels do not share two common alignment directions.

4. A method for manufacturing a liquid crystal display element including a pair of transparent substrates, a liquid crystal sandwiched between said pair of transparent substrates, and liquid crystal alignment films formed between side surfaces of said respective transparent substrates and said liquid crystal, said method comprising the steps of:

forming ultraviolet light responsive type liquid crystal alignment films over first sides of said pair of transparent substrates; and irradiating the alignment films such that each of a plurality of dot regions of said display has a first alignment direction for a front alignment film portion of said dot and a second alignment direction for a back alignment film portion of said dot with no other alignment directions for said dot;

wherein four closely arranged dot regions each have two different alignment directions and none of the four dot regions share two common alignment directions.

5. A method for manufacturing a liquid crystal display element including a pair of transparent substrates, a liquid crystal sandwiched between said pair of transparent substrates, and liquid crystal alignment films formed between side surfaces of said respective transparent substrates and said liquid crystal, said method comprising the steps of:

forming ultraviolet light responsive type liquid crystal alignment films over first sides of said pair of transparent substrates; and irradiating the alignment films such that each of a plurality of dot regions of said display has a first alignment direction for a front alignment film portion of said dot and a second alignment direction for a back alignment film portion of said dot with no other alignment directions for said dot;

wherein said liquid crystal alignment directions are in opposite directions for each of the alignment films at respective regions of the alignment films corresponding to adjacent dots.

6. A method for manufacturing a liquid crystal display element including a pair of transparent substrates, a liquid crystal sandwiched between said pair of transparent substrates, and liquid crystal alignment films formed between liquid crystal side surfaces of said respective transparent substrates and said liquid crystal, said method comprising the steps of:

forming ultraviolet light responsive type liquid crystal alignment films over first sides of said pair of transparent substrates; and irradiating the alignment films such that each of a plurality of pixel regions of said display has a first alignment direction for a front alignment film portion of said pixel and a second alignment direction for a back alignment film portion of said pixel with no other alignment directions for said pixel;

wherein each of four closely arranged pixel regions do not share two common alignment directions.

7. A method for manufacturing a liquid crystal display element including a pair of transparent substrates, a liquid crystal sandwiched between said pair of transparent substrates, and liquid crystal alignment films formed between liquid crystal side surfaces of said respective transparent substrates and said liquid crystal, said method comprising the steps of:

forming ultraviolet light responsive type liquid crystal alignment films over first sides of said pair of transparent substrates; and irradiating the alignment films such that each of a plurality of pixel regions of said display has a first alignment direction for a front alignment film portion of said pixel and a second alignment direction for a back alignment film portion of said pixel with no other alignment directions for said pixel;

wherein adjacent pixels do not share two common alignment directions.

* * * * *